(12) United States Patent
Roegner et al.

(10) Patent No.: US 8,449,422 B2
(45) Date of Patent: May 28, 2013

(54) AUTOMATIC TRANSMISSION FOR A VEHICLE

(75) Inventors: Horst Roegner, Oberteuringen (DE); Gabor Diosi, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 362 days.

(21) Appl. No.: 12/950,051

(22) Filed: Nov. 19, 2010

(65) Prior Publication Data

US 2011/0143876 A1 Jun. 16, 2011

(30) Foreign Application Priority Data

Dec. 10, 2009 (DE) .......................... 10 2009 054 477

(51) Int. Cl.
*F16H 31/00* (2006.01)
(52) U.S. Cl.
USPC ............................. 475/116; 475/127; 475/138
(58) Field of Classification Search
USPC .................................................. 475/116–148
See application file for complete search history.

(56) References Cited

U.S. PATENT DOCUMENTS

| 5,624,340 | A | * | 4/1997 | Forster | 475/72 |
|---|---|---|---|---|---|
| 6,547,686 | B1 | | 4/2003 | Thorenz | |
| 6,719,656 | B2 | * | 4/2004 | Bowen | 475/5 |
| 7,537,536 | B2 | * | 5/2009 | Hvolka et al. | 475/146 |
| 7,909,140 | B2 | * | 3/2011 | Sugihara et al. | 184/6.12 |
| 7,931,556 | B2 | * | 4/2011 | Diosi et al. | 475/116 |
| 8,062,168 | B2 | * | 11/2011 | Ziemer et al. | 475/331 |
| 2008/0269003 | A1 | * | 10/2008 | Bauknecht et al. | 475/276 |
| 2009/0283379 | A1 | | 11/2009 | Lee | |

FOREIGN PATENT DOCUMENTS

| DE | 199 08 840 A1 | 9/2000 |
|---|---|---|
| DE | 10 2008 060 423 A1 | 11/2009 |

* cited by examiner

*Primary Examiner* — Tisha Lewis
(74) *Attorney, Agent, or Firm* — Davis & Bujold, PLLC

(57) ABSTRACT

A transmission for a vehicle with a clutch and/or a brake which is hydraulically actuated by a cylinder and a piston actuator. A pressure chamber is located between the cylinder and the piston and a hydraulic pressure medium flows into the pressure chamber via an inlet. The pressure medium is supplied to the pressure chamber via a component fixed on the housing, a rotary passage between the fixed component and the rotatable component and then via the rotatable component. The radial distance of the radial middle of the rotary passage is larger than the smallest radial distance and smaller than the largest radial distance of the pressure chamber from the rotation axis of a central shaft of the automatic transmission. The radial arrangement of the rotary passage, between the radially smallest and largest diameters of the pressure chamber, neutralizes centrifugally generated forces on the pressure medium in the pressure chamber.

8 Claims, 1 Drawing Sheet

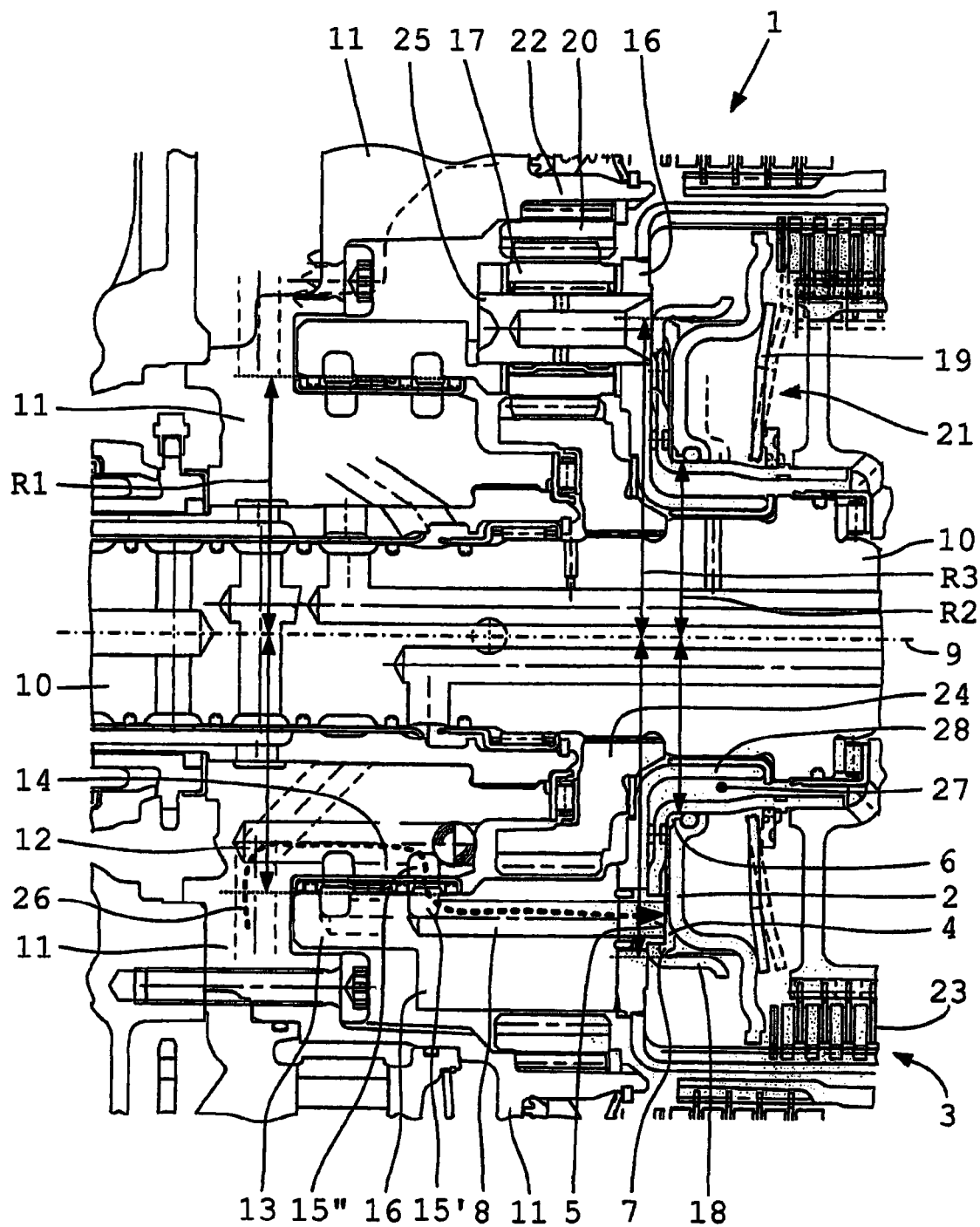

AUTOMATIC TRANSMISSION FOR A VEHICLE

This application claims priority from German patent application serial no. 10 2009 054 477.1 filed Dec. 10, 2009.

FIELD OF THE INVENTION

The invention concerns an automatic transmission for a vehicle.

BACKGROUND OF THE INVENTION

An automatic transmission of the type discussed here is known, for example, from DE 199 08 840 A1. This automatic transmission comprises at least one wet-operating disk clutch actuated by at least one hydraulically operated actuator. The actuator comprises a cylinder and a piston guided axially in the cylinder, which enclose a pressure chamber between them. The pressure chamber can be filled with a hydraulic pressure medium, which produces on the piston a closing force that acts in the direction toward the disks of the disk clutch. The hydraulic fluid is delivered to the actuator via an axial bore in a central transmission shaft, which is provided with a radial bore. This radial bore in the transmission shaft is in flow communication with the pressure chamber of the actuator via other radial flow ducts in other transmission components. The feeding of the hydraulic pressure medium thus takes place as usual along the shortest possible path, from radially inside to radially outside.

Since during the operation of the automatic transmission, in addition to the actuation pressure the hydraulic pressure medium filled into the pressure chamber of the actuator is also acted upon by a centrifugal force, automatic transmissions of the type concerned comprise, axially adjacent to the actuator piston, a pressure compensation space in which unpressurized pressure medium also accumulates, and under the action of the centrifugal forces caused by rotation, exerts a force opposing the forces produced by rotation on the pressure medium in the adjacent pressure chamber of the actuator. These forces compensate one another, so that only the desired actuation force acts on the piston as a force differential.

The arrangement of such pressure compensation spaces leads to a previously unavoidable lengthening of the automatic transmission and to an increase of its manufacturing costs.

SUMMARY OF THE INVENTION

The purpose of the present invention is therefore to introduce an automatic transmission of the type concerned, with a hydraulically operated actuator, in which the effect of pressure medium forces generated centrifugally during operation of the transmission and acting upon the piston, are avoided or compensated for by simply designed measures.

Accordingly, the invention starts from an automatic transmission for a motor vehicle, with a shifting and/or starting element in the form of a clutch or brake, and with a hydraulically operated actuator for actuating the shifting and/or starting element, in which the actuator comprises a cylinder and a piston axially guided in the cylinder, such that a pressure chamber is formed between the cylinder and the piston, into which a hydraulic pressure medium can flow via an inlet.

To achieve the stated objective it is provided that the pressure medium is introduced first via a component arranged fixed on the housing and from there, via at least one component arranged to be able to rotate and connected to the pressure chamber of the actuator, and that between the component fixed on the housing and the rotating component at least one rotary passage for the pressure medium is formed, and the radial distance of the rotary passage between the inner and outer effective diameters of the piston is designed such that the dynamic pressure components produced by centrifugal force in the piston space are completely eliminated.

In a simply designed manner this measure ensures that during operation of the transmission, the undesired centrifugal forces acting in the hydraulic pressure medium in the pressure chamber in relation to the piston are mutually compensated. This is because due to the transfer of the pressure medium from the fixed transmission component to the rotating transmission component at an effective radius located between the largest and smallest radius of the actuator's pressure chamber, the pressure chamber is divided into two zones, namely a first zone located in the radial direction between the transfer radius and the radially outer limit of the pressure chamber, and a second zone located between the transfer radius and the radially inner limit of the pressure chamber.

In the radially inner zone of the pressure chamber, when the components of the actuator rotate and pressure medium is introduced in order to produce a control force acting on the piston, an underpressure is produced relative to the radially outer zone, which brings about a compensation of the overpressure created in the outer zone due to the rotation. Thus, it is not necessary to provide a pressure compensation space axially adjacent to the piston as necessary in the prior art, and this saves structural space and costs.

As a further design feature of the invention it can be provided that the component fixed on the housing and conveying the pressure medium is in the form of a transmission-internal intermediate plate, on which a ring gear carrier is formed.

As regards the rotating component that conveys the pressure medium, it can be provided that this is in the form of a planetary gear carrier. Advantageously, both the ring gear carried by the ring gear carrier and the planetary gear carrier belong to the same planetary gearset.

According to a further design feature it is provided that in the planetary gear carrier and in the bolts on which the planetary gears are mounted, feed ducts for conveying the pressure medium to the pressure chamber of the actuator are formed.

Structural space can also be saved by arranging an inlet into the pressure chamber, which is in flow communication with the pressure medium ducts in the planetary bolts, between the radially inner periphery and the radially outer periphery of the pressure chamber.

To deliver as uniform as possible a supply of hydraulic pressure medium to the pressure chamber of the actuator, it is preferably provided that the pressure chamber has a plurality of inlets distributed around its circular periphery. In a further development of this design a plurality of feed ducts are provided, of which in each case a feed duct is in active connection with one of the plurality of inlets.

The at least one feed duct in the rotating transmission component is preferably in flow-enabling connection via a rotary passage with a feed duct in a transmission component fixed on the housing, so that at this point a transfer of the pressure medium from the static transmission housing system to the rotary system of the rotating transmission component takes place. A rotary passage is understood to mean a transfer of the pressure medium from a rotating component to another rotating component or to a component fixed on the housing, this transfer of pressure medium taking place with as little leakage as possible.

BRIEF DESCRIPTION OF THE DRAWING

Below, the invention is explained in greater detail with reference to a drawing which illustrates an example embodiment. The single FIGURE shows a partial longitudinal section through an automatic transmission 1, in the area of an actuator 21 which serves to operate a transmission shifting element in the form of a wet-operating disk clutch 3.

DETAILED DESCRIPTION OF THE PREFERRED EMBODIMENTS

The actuator 21 comprises a cylinder 18 and a piston 2 arranged to move axially therein. In an actuating position the piston 2 presses against the disks 23 of the disk clutch 3, so that the clutch can transmit a torque. To produce an axial restoring force a spring 19, in this case a cup spring, acts on the piston 2. Between the piston 2 and the cylinder 18 is enclosed a pressure chamber 4, into which a hydraulic pressure medium can be filled into the cylinder 18 via an inlet 5.

The cylinder 18 is connected in a rotationally fixed manner to a planetary gear carrier 16 and arranged to rotate with it about the longitudinal axis 9 of a central transmission shaft 10. The planetary gear carrier 16 is part of a planetary gear stage of the automatic transmission 1 arranged adjacent to the actuator 21 and the disk clutch 3. Thus, the planetary gear carrier 16 supports planetary gears 17 mounted on bolts 25, which mesh radially on the inside with a sun gear 24 mounted to rotate on the transmission shaft 10, and radially on the outside with a ring gear 20 fixed on the housing.

The pressure chamber 4 has a radially inner periphery 6 and a radially outer periphery 7, and is connected by at least one inlet 5 to at least one inlet duct 8 in the planetary web of the planetary gear carrier 16. In the area of an axial section 13 of the planetary gear carrier 16 the inlet duct 8 is connected, via a rotary passage 15' and by a rotary passage 15" in the area of an axial section 14 of a component 11 fixed on the housing, to an inlet duct 12 for the hydraulic pressure medium.

In this example embodiment the rotary passage 15', 15" is essentially the same radial distance away from the rotation axis 9 of the shaft 10 as is the inlet 5 to the pressure chamber 4. In this case the rotationally fixed component 11 is in the form of a transmission-internal intermediate plate, which is fixed to the transmission housing (not shown) and on which a ring gear carrier 22 for the ring gear 20 is also formed.

According to the invention, the rotary passage 15', 15" for the hydraulic pressure medium is located radially between the inner periphery 6 and the outer periphery 7 of the pressure chamber 4, so that centrifugally generated forces in the pressure medium occurring in the pressure chamber 4 mutually compensate one another. In the single FIGURE of the drawing it can be seen clearly that the radial distance R1 of the rotary passage 15', 15" is larger than the smallest radial distance R2 and smaller than the largest radial distance R3 of the pressure chamber 4 from the rotation axis 9 of a central transmission shaft 10 of the automatic transmission 1. The dotted arrow 26 indicates the flow direction of the pressure medium from the rotationally fixed component (intermediate plate 11), via the rotary passage 15', 15" and the rotating planetary gear carrier 16, into the pressure chamber 4 in the clutch actuator 21.

Other feed ducts visible in the drawing FIGURE can serve to supply the disk clutch 3 and/or transmission components close to it with coolant or lubricant. Still other ducts can serve to supply lubricant to the transmission gearwheels, for example the planetary gears 17 of the planetary transmission. In that case the rotary passage or fluid transfer point can also comprise a plurality of separately guided fluid flows, in particular oil flows. For example, coolant and lubricant can be passed into the annular space 27 formed between the cylinder 18 of the actuator 21 and a slide bearing supporting section 28 of the planetary gear carrier 16.

The disk clutch shown in the single FIGURE of the drawing can be a pure transmission shifting element or a combined shifting and/or starting element, so that in the latter variant it can also be used for starting processes of a motor vehicle.

INDEXES

1 Automatic transmission
2 Piston
3 Disk clutch, shifting and/or starting clutch
4 Pressure chamber
5 Inlet to the pressure chamber
6 Radially inner periphery of the pressure chamber
7 Radially outer periphery of the pressure chamber
8 Inlet duct to the pressure chamber
9 Rotation axis of the shaft 10
10 Shaft
11 Component fixed to the housing, intermediate plate
12 Inlet duct
13 Section of the planetary carrier 16
14 Section of the component fixed to the housing 11
15' Rotary passage
15" Rotary passage
16 Planetary carrier
17 Planetary gearwheel
18 Cylinder
19 Spring
20 Ring gear
21 Actuator
22 Ring gear carrier
23 Clutch disks
24 Solar gear
25 Planetary bolts
26 Flow direction of the pressure medium
27 Annular space between the cylinder 18 and the supporting section 28
28 Supporting section of the planetary carrier
R1 Radius of the rotary passage 15', 15"
R2 Radius of the radially inner periphery of the pressure chamber 4
R3 Radius of the radially outer periphery of the pressure chamber 4

The invention claimed is:

1. An automatic transmission (1) for a motor vehicle, with at least one of a shifting and a starting element (3) in the form of either a clutch or a brake, and with a hydraulically operated actuator (21) for actuating the at least one of the shifting and the starting element (3), the actuator (21) comprising a cylinder (18) and a piston (2) being guided within the cylinder (18), a pressure chamber (4) being formed between the cylinder (18) and the piston (2), and hydraulic pressure medium flowing into the pressure chamber (4) via an inlet (5), wherein the pressure medium is first fed via a component (11), fixed on a housing and, from there, into the pressure chamber (4) of the actuator (21) via at least one rotating component (16);

at least one rotary passage (15', 15") for the pressure medium is formed between the component (11) fixed on the housing and the rotating component (16) such that the pressure medium flows radially outward through the at least one rotary passage from the component (11) fixed on the housing to the rotating component, and a radial distance (R1) of a radial mid-point of the rotary passage (15', 15") from the rotational axis (9) of a central shaft (10) of the automatic transmission (1) is larger than a smallest radial distance (R2) of the pressure chamber (4) from the rotational axis and smaller than a largest radial distance (R3) of the pressure chamber (4) from the rotational axis.

2. An automatic transmission (1) for a motor vehicle, with at least one of a shifting and a starting element (3) in the form of either a clutch or a brake, and with a hydraulically operated actuator (21) for actuating the at least one of the shifting and the starting element (3) the actuator (21) comprising a cylinder (18) and a piston (2) being guided within the cylinder (18), a pressure chamber (4) being formed between the cylinder (18) and the piston (2) and hydraulic pressure medium flowing into the pressure chamber (4) via an inlet (5), wherein the pressure medium is first fed via a component (11), fixed on a housing and, from there, into the pressure chamber (4) of the actuator (21) via at least one rotating component (16);

at least one rotary passage (15', 15") for the pressure medium is formed between the component (11) fixed on the housing and the rotating component (16), a radial distance (R1) of a radial middle of the rotary passage (15', 15") from the rotation axis (9) of a central shaft (10) of the automatic transmission (1) is larger than a smallest radial distance (R2) and smaller than a largest radial distance (R3) of the pressure chamber (4) from the axis, and the component (11) fixed on the housing is an intermediate plate (11) on which a ring gear carrier (22) is formed.

3. The automatic transmission according to claim 1, wherein the rotating component (16) is a planetary gear carrier (16).

4. The automatic transmission according to claim 3, wherein inlet ducts (8) for supplying the pressure medium to the pressure chamber (4) of the actuator (21) are formed in the planetary gear carrier (16) and in planetary bolts (25) on which the planetary gears (17) are mounted.

5. The automatic transmission according to claim 1, wherein the inlet (5) into the pressure chamber (4) is located between a radially inner periphery (6) and a radially outer periphery (7) of the pressure chamber (4).

6. An automatic transmission (1) for a motor vehicle, the transmission comprising at least one of a shifting element and a starting element (3) formed as one of a clutch and a brake which is actuated by a hydraulically operated actuator (21), the actuator (21) comprising a cylinder (18) with a piston (2) being guided within the cylinder (18), a pressure chamber (4) being formed between the cylinder (18) and the piston (2), and hydraulic pressure medium flowing into the pressure chamber (4) via an inlet (5), the pressure medium flowing via a first passage in a fixed component (11) that is fixed to a housing, and from the first passage in the fixed component (11), via at least one rotary passage (15', 15"), to a second passage in at least one rotating component (16) and through the inlet (5) into the pressure chamber (4) of the actuator (21), a radial distance (R1) of a radial middle of the rotary passage (15', 15"), from a rotational axis (9) of a central shaft (10) of the automatic transmission (1), is larger than a smallest radial distance (R2) of the pressure chamber (4) from the rotational axis (9) of the central shaft (10) and smaller than a largest radial distance (R3) of the pressure chamber (4) from the rotational axis (9) of the central shaft (10).

7. The automatic transmission according to claim 6, wherein the fixed component (11) is an intermediate plate (11) which supports a ring gear carrier (22).

8. The automatic transmission according to claim 7, wherein the rotating component (16) is a planetary gear carrier (16).

* * * * *